US010118257B2

(12) United States Patent
Durrant et al.

(10) Patent No.: US 10,118,257 B2
(45) Date of Patent: Nov. 6, 2018

(54) CONDITIONED ISOLATION ELEMENTS AND SENSOR ASSEMBLIES

(71) Applicant: Quartzdyne, Inc., Salt Lake City, UT (US)

(72) Inventors: Nicholas B. Durrant, Provo, UT (US); G. Scott Brown, Eagle Mountain, UT (US); K. Robert Harker, West Jordan, UT (US)

(73) Assignee: Quartzdyne, Inc., Salt Lake City, UT (US)

( * ) Notice: Subject to any disclaimer, the term of this patent is extended or adjusted under 35 U.S.C. 154(b) by 211 days.

(21) Appl. No.: 14/919,338

(22) Filed: Oct. 21, 2015

(65) Prior Publication Data

US 2016/0138992 A1 May 19, 2016

Related U.S. Application Data

(60) Provisional application No. 62/081,276, filed on Nov. 18, 2014.

(51) Int. Cl.
*B23K 31/02* (2006.01)
*G01L 19/00* (2006.01)
*C21D 1/30* (2006.01)
*C21D 1/26* (2006.01)
*G01L 19/06* (2006.01)
*B23K 101/36* (2006.01)

(52) U.S. Cl.
CPC ............. *B23K 31/02* (2013.01); *C21D 1/26* (2013.01); *C21D 1/30* (2013.01); *G01L 19/0092* (2013.01); *G01L 19/0645* (2013.01); *B23K 2201/36* (2013.01)

(58) Field of Classification Search
CPC ............. G01L 19/0046; G01L 19/0092; G01L 19/0627; G01L 19/0645; G01L 19/0663; G01L 19/14; G01L 7/088; B23K 31/02; C21D 1/26; C21D 1/30
USPC ...................................... 73/706, 756; 137/84
See application file for complete search history.

(56) References Cited

U.S. PATENT DOCUMENTS

| 3,561,832 | A | 2/1971 | Kerrer et al. |
| 4,550,610 | A | 11/1985 | EerNisse |
| 5,231,880 | A | 8/1993 | Ward et al. |
| 5,471,882 | A | 12/1995 | Wiggins |
| 6,131,462 | A | 10/2000 | EerNisse et al. |
| 6,242,829 | B1 * | 6/2001 | Scarsdale ................ E21B 4/003 310/87 |
| 8,333,117 | B2 | 12/2012 | Brown et al. |

(Continued)

OTHER PUBLICATIONS

Alloy 625, Impressive past/significant present/a awesome future, by Smith et al., TMS (The Minerals, Metals & Materials Society), pp. 35-46, 2001.*

*Primary Examiner* — Manish S Shah
*Assistant Examiner* — Suman K Nath
(74) *Attorney, Agent, or Firm* — TraskBritt

(57) ABSTRACT

A method of forming a conditioned isolation element for a sensor assembly comprises subjecting a preformed isolation element structure to at least one thermal annealing process to form a conditioned isolation element structure substantially less susceptible to at least one of hydrogen permeation, hydrogen-based embrittlement, and hydrogen-based stress-cracking. Conditioned isolation elements and sensor assemblies are also described.

18 Claims, 4 Drawing Sheets

(56) References Cited

U.S. PATENT DOCUMENTS

2007/0292071 A1\* 12/2007 Zerwekh ................ E21B 47/06
                                                            385/12

\* cited by examiner

CONDITIONED ISOLATION ELEMENTS AND SENSOR ASSEMBLIES

CROSS-REFERENCE TO RELATED APPLICATION

This application claims the benefit of U.S. Provisional Patent Application Ser. No. 62/081,276, filed Nov. 18, 2014, the disclosure of which is hereby incorporated herein in its entirety by this reference.

FIELD

The disclosure, in various embodiments, relates generally to methods, structures, and assemblies for use in isolating a sensor from a working environment. More particularly, embodiments of the disclosure relate to methods of forming a conditioned isolation element for a sensor assembly, and to related conditioned isolation elements and sensor assemblies.

BACKGROUND

Sensors for monitoring at least one of pressure and temperature, sometimes interchangeably called transducers, have been used successfully in the downhole environment of oil and gas wells for several decades, and are still conventional means for determining downhole pressures, such as, for example, bottom-hole pressure and annulus pressure. For example, quartz pressure sensors may be used to determine downhole pressure. Conventionally, an isolation element and an isolation fluid are disposed between a working environment that is being monitored for temperature and pressure changes and the sensor of the transducer used to conduct the measurements. Isolation elements may, for example, include diaphragm structures, bladder structures, and bellows structures. In addition, a variety of fluids have been employed as isolation fluids including various hydrocarbon liquids.

Sensor isolation schemes should protect the sensor from the fluid environment being measured and enable accurate, responsive, and repeatable measurements by the sensor when in use. Furthermore, the isolation element and its connection to the sensor or housing in which the sensor is located should be substantially immune to any hostile properties of the fluid environment. Non-limiting areas of potential application for such an isolation element include downhole applications (e.g., drilling applications, exploration applications, production applications, completion applications, logging applications, etc.), aerospace applications, purified liquid and gas handling applications, medical applications, petrochemical applications, and other industrial applications.

Many materials that may be present in a working environment in which a sensor is placed should be substantially isolated from the sensor. Examples of such materials include hydrogen, hydrogen sulfide, carbon dioxide, oxygen, water, and various solvents, some of which may readily permeate components of a conventional isolation element and/or may chemically degrade (e.g., deteriorate, corrode, etc.) the components. Material diffusion through the isolation element can interfere with desired movement (e.g., expansion, compression, etc.) of the isolation element, can reduce measurement accuracy and/or precision, and can even render the isolation element inoperative. For example, diffused hydrogen (e.g., diffusion hydrogen gas, diffused hydrogen ions, etc.) may undesirably deform components (e.g., diaphragm structures, bladder structures, bellows structures, etc.) of the isolation element, which may result in undesirable calibration shifts, zero offsets, and/or component damage (e.g., rupture). In addition, the components of the isolation element, particularly those of thin wall cross-section, can deteriorate over time when exposed to highly corrosive fluids (e.g., liquids, gases, combinations thereof, etc.). Furthermore, elevated temperatures and/or elevated pressures, such as those present in downhole applications, can accelerate undesirable material diffusion and/or chemical degradation.

It would, therefore, be desirable to have new methods, structures, and assemblies that mitigate one or more of the problems conventionally associated with sensor isolation.

BRIEF SUMMARY

Embodiments described herein include methods of forming a conditioned isolation element for a sensor assembly, related conditioned isolation elements, and related sensor assemblies. For example, in accordance with one embodiment described herein, a method of forming a conditioned isolation element for a sensor assembly comprises subjecting a preformed isolation element structure to at least one thermal annealing process to form a conditioned isolation element structure substantially less susceptible to at least one of hydrogen permeation, hydrogen-based embrittlement, and hydrogen-based stress-cracking.

In additional embodiments, a conditioned isolation element for a sensor assembly comprises at least one conditioned structure comprising an annealed material substantially impermeable to hydrogen and resistant to at least one of physical degradation and chemical degradation.

In further embodiments, a sensor assembly comprises a conditioned isolation element comprising at least one conditioned structure comprising an annealed material substantially impermeable to hydrogen and resistant to at least one of physical degradation and chemical degradation, a sensor housing coupled to the conditioned isolation element and exhibiting a chamber in fluid communication with the conditioned isolation element, and at least one sensor within the chamber.

DETAILED DESCRIPTION

Figure 1A:
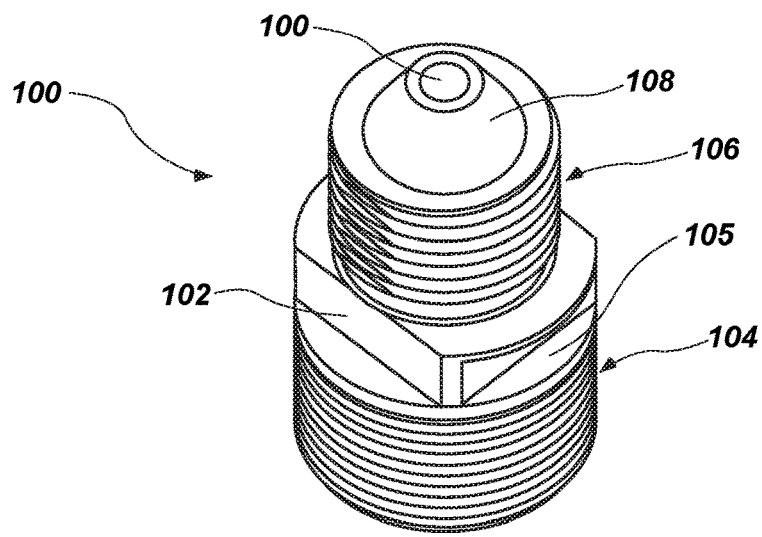
FIG. 1A is a perspective view of a conditioned isolation element including a conditioned bellows structure, in accordance with an embodiment of the disclosure.

Methods of forming a conditioned isolation element for a sensor assembly are described, as are conditioned isolation elements, and sensor assemblies. In some embodiments, a method of forming a conditioned isolation element for a sensor assembly includes subjecting a preformed isolation element structure (e.g., a preformed bellows structure, a preformed diaphragm structure, etc.) to at least one thermal annealing process to form a conditioned isolation element structure exhibiting reduced (e.g., substantially reduced) permeability to hydrogen (e.g., to hydrogen gas, hydrogen ions, etc.). The thermal annealing process may efficiently modify one or more properties (e.g., density, porosity, etc.) of a material (e.g., a chemically-resistant and/or physically-resistant material) of the preformed isolation element structure. The conditioned isolation element may be included in a sensor assembly for use in a given application (e.g., a downhole application, an aerospace application, a purified liquid and gas handling application, a medical application, a petrochemical application, an industrial application, etc.). The methods, conditioned isolation elements, and sensor assemblies of the disclosure may provide reduced costs and enhanced efficiency, reliability, and durability and relative to conventional methods, isolation elements, and sensor assemblies.

The following description provides specific details, such as material types and processing conditions (e.g., temperatures, pressures, durations, etc.) in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided herein does not form a complete process flow for forming a bellows structure, a diaphragm, an isolation element, or a sensor assembly. Only those process acts and structures necessary to understand the embodiments of the disclosure are described in detail below. Additional acts to form the complete conditioned isolation element and/or sensor assembly may be performed by conventional fabrication techniques. Also note, any drawings accompanying the present application are for illustrative purposes only, and are thus not drawn to scale. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

Figure 1B:
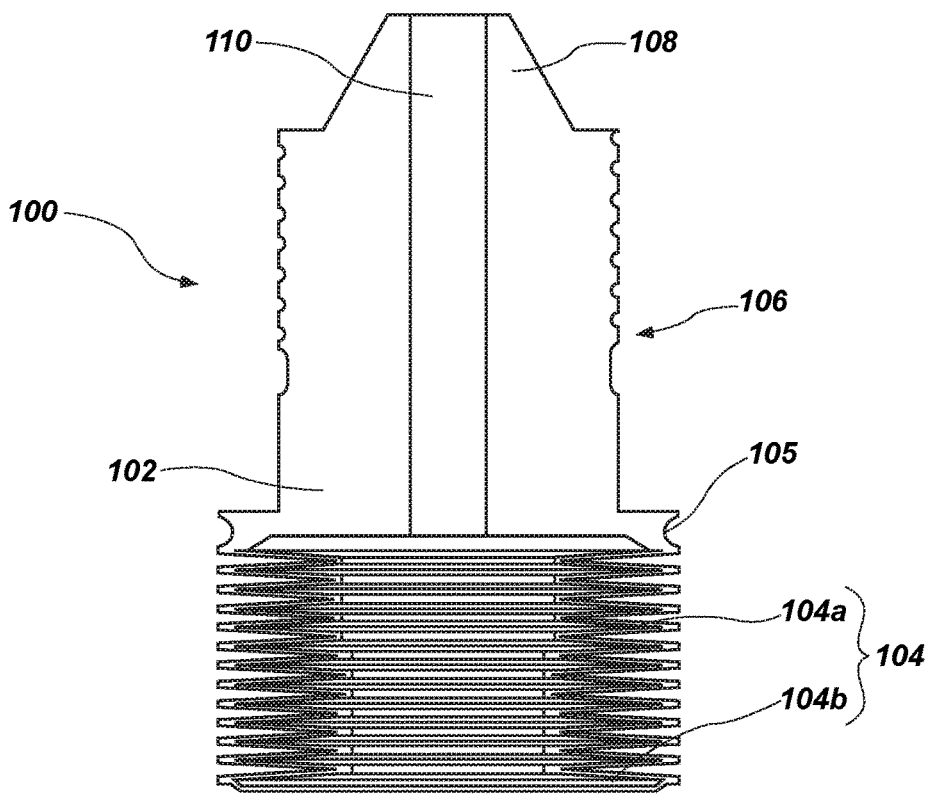
FIG. 1B is a cross-sectional side view of the conditioned isolation element of FIG. 1A.

FIG. 1A is a perspective view of a conditioned isolation element 100 for a sensor assembly, in accordance with an embodiment of the disclosure. The conditioned isolation element 100 includes a housing structure 102, and conditioned bellows structure 104 attached (e.g., bonded, coupled, etc.) to the housing structure 102. The conditioned bellows structure 104 may be attached to the housing structure 102 along one or more peripheral surfaces of the housing structure 102. For example, as shown in FIG. 1B, which is an enlarged partial cross-sectional side view of the conditioned isolation element 100, the conditioned bellows structure 104 may be attached to one or more surfaces defining an undercut region (e.g., recessed region, shelf 105, etc.) of the housing structure 102. The conditioned bellows structure 104 and the housing structure 102 may be attached to one another by any suitable means including, but not limited to, a welding process (e.g., an electron-beam welding process, a tungsten arc welding process, a gas metal arc welding process, a flux-shielded arc welding process, an oxygen-acetylene torch welding process, etc.). An electron-beam welding process may, for example, enable the conditioned bellows structure 104 and the housing structure 102 to be attached to one another without exposing large portions of the conditioned bellows structure 104 and the housing structure 102 to excessive heat that may otherwise negatively affect desirable properties of the conditioned bellows structure 104 and/or the housing structure 102. In additional embodiments, the conditioned bellows structure 104 and the housing structure 102 may be attached to one another by other means (e.g., an adhesive).

As shown in FIGS. 1A and 1B, the housing structure 102 may include a threaded stem region 106, a sealing element 108 extending from an upper portion of the threaded stem region 106, and at least one opening 110 (e.g., via, bore, aperture, etc.) extending through the housing structure 102. The threaded stem region 106 and the sealing element 108 may facilitate sealing engagement of the conditioned isolation element 100 to another structure (e.g., another structure of a sensor assembly, such as a sensor housing). The opening 110 may facilitate communication (e.g., fluid communication) between the conditioned isolation element 100 and the another structure, and may exhibit any desired lateral cross-sectional shape including, but not limited to, a circular shape, a tetragonal shape (e.g., square, rectangular, trapezium, trapezoidal, parallelogram, etc.), a triangular shape, a semicircular shape, an ovular shape, an elliptical shape, or a combination thereof.

The housing structure 102 may be formed of and include at least one material that is resistant to at least one of physical degradation (e.g., abrasion, erosion, etc.) and chemical degradation (e.g., corrosion). The housing structure 102 may, for example, be formed of and include at least one material suitable for use in a high-pressure, high-temperature, corrosive, and/or abrasive environment, such as the extremely aggressive environments of various downhole applications (e.g., drilling applications, conditioning applications, logging applications, measurement applications, monitoring applications, exploring applications, etc.). By way of non-limiting example, the housing structure 102 may be formed of and include a metal (e.g., tungsten, titanium, molybdenum, niobium, vanadium, hafnium, tantalum, chromium, zirconium, iron, nickel, copper, aluminum, silicon, etc.), a metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), a ceramic (e.g., carbides, nitrides, oxides, and/or borides, such as carbides and borides of at least one of tungsten, titanium, molybdenum, niobium, vanadium, hafnium, tantalum, chromium, zirconium, aluminum, and silicon), and a ceramic-metal composite material. Suitable materials are commercially available from numerous sources, such as from Special Metals Corp., of New Hartford, N.Y., under the trade name INCONEL®, or from Haynes, Intl, Inc., of Kokomo, Ind., under the trade name HASTELLOY®. In some embodiments, the housing structure 102 is formed of and includes INCONEL® 625 alloy steel.

As shown in FIG. 1B, the conditioned bellows structure 104 may include conditioned, corrugated sidewalls 104a coupled to a conditioned floor 104b (e.g., a conditioned base structure). The conditioned, corrugated sidewalls 104a may include a plurality of corrugations (e.g., a series of alternating ridges and grooves) configured to deform (e.g., comply, expand, compress, etc.) in response to changes (e.g., increases, decreases, etc.) in at least one of applied pressure and applied temperature. The conditioned, corrugated sidewalls 104a may include any number of the corrugations, such as from about three (3) corrugations to about one hundred (100) corrugations.

The conditioned bellows structure 104 may be formed of and include at least one material that is resistant to physical degradation and/or chemical degradation (e.g., at least one material suitable for use in a high-pressure, high-temperature, corrosive, and/or abrasive environment, such as the extremely aggressive environments of various downhole applications). In addition, the material is conditioned (e.g., modified) to exhibit at least one of reduced residual stress, reduced porosity, increased density, reduced defects, and reduced material permeability as compared to an unconditioned state of the material. The conditioned state of the material (and, hence, the conditioned bellows structure 104) may be substantially less susceptible to material permeation, embrittlement, and/or stress-cracking than the unconditioned state of the material (and, hence, an unconditioned bellows structure). For example, the conditioned state of the material may be at least two times (2×) less susceptible to hydrogen permeation (e.g., hydrogen gas permeation, hydrogen ion permeation), hydrogen-based embrittlement, and/or hydrogen-based stress-cracking, such as at least three times (3×) less susceptible, at least four times (4×) less susceptible, or substantially insusceptible. In some embodiments, the conditioned bellows structure 104 is formed of and includes at least one conditioned material substantially impermeable to hydrogen.

By way of non-limiting example, the conditioned bellows structure 104 may be formed of and include at least one of a conditioned metal (e.g., tungsten, titanium, molybdenum, niobium, vanadium, hafnium, tantalum, chromium, zirconium, iron, nickel, copper, aluminum, silicon, etc.), a conditioned metal alloy (e.g., a cobalt-based alloy, an iron-based alloy, a nickel-based alloy, an iron- and nickel-based alloy, a cobalt- and nickel-based alloy, an iron- and cobalt-based alloy, an aluminum-based alloy, a copper-based alloy, a magnesium-based alloy, a titanium-based alloy, a steel, a low-carbon steel, a stainless steel, etc.), a conditioned ceramic (e.g., carbides, nitrides, oxides, and/or borides, such as carbides and borides of at least one of tungsten, titanium, molybdenum, niobium, vanadium, hafnium, tantalum, chromium, zirconium, aluminum, and silicon), and a conditioned ceramic-metal composite material. The material composition of the conditioned bellows structure 104 may be substantially the same as the material composition of the housing structure 102, or may be different than the material composition of the housing structure 102. In some embodiments, the conditioned bellows structure 104 is formed of and includes conditioned INCONEL® 625 alloy steel.

The conditioned bellows structure 104, including the conditioned material thereof, may be formed by subjecting a preformed bellows structure to at least one thermal annealing process. As used herein, the term "thermal annealing" means and includes a heat treatment applied to at least a portion of a structure to modify one or more properties (e.g., physical properties, chemical properties, etc.) of the at least a portion of the structure. The preformed bellows structure may be formed using conventional processes (e.g., cutting processes, shaping processes, stamping processes, welding processes, laser treatment processes, etc.) and equipment, which are not described in detail herein. The thermal annealing process may modify one or more physical properties (e.g., residual stresses, material density, material porosity, structural defects, etc.) of the preformed bellows structure.

In some embodiments, a preformed bellows structure is subjected to at least one furnace annealing process to form the conditioned bellows structure 104. The temperature(s) and duration(s) of the furnace annealing process may at least partially depend on the dimensions and material composition of the preformed bellows structure. As a non-limiting example, the preformed bellows structure may be exposed to at least one temperature greater than or equal to about 900° C. (e.g., greater than or equal to about 950° C., greater than or equal to about 975° C., greater than or equal to about 1000° C., or greater than or equal to about 1025° C.), and may be held at the at least one temperature for greater than or equal to about 30 minutes (e.g., greater than or equal to about 40 minutes, greater than or equal to about 45 minutes, greater than or equal to about 50 minutes, or greater than or equal to about 55 minutes). In some embodiments, the preformed bellows structure is furnace annealed for about 55 minutes at about 1037.8° C. (about 1900° F.).

The furnace annealing process may be performed under any suitable ambient conditions. For example, the furnace annealing process may be performed in an inert atmosphere, such as a nitrogen ($N_2$) atmosphere. In addition, the furnace annealing process may utilize any suitable pressure, or range of pressures. For example, the furnace annealing process may be performed at about atmospheric pressure, or may be performed under negative pressure (e.g., under vacuum). In some embodiments, the furnace annealing process includes heating the preformed bellows structure under negative pressure (e.g., within a vacuum furnace), followed by an inert quench (e.g., purge), such as an $N_2$ quench. The inert quench may, for example, proceed until the conditioned bellows structure 104 is cooled to a predetermined temperature (e.g., a temperature less than or equal to about 600° C., such as less than or equal to about 500° C., less than or equal to about 400° C., less than or equal to about 300° C., or less than or equal to about 200° C.), and then the environmental conditions may be modified to further cool the conditioned bellows structure 104. For example, after the conditioned bellows structure 104 reaches the predetermined temperature, the inert quench may be removed, and the conditioned bellows structure 104 may be further cooled in an air atmosphere. In some embodiments, the furnace annealing process includes heating the preformed bellows structure under negative pressure and a temperature of about 1037.8° C. for about 55 minutes to form the conditioned bellows structure 104, performing an $N_2$ quench until the conditioned bellows structure 104 reaches a temperature of about 176.7° C. (about 350° F.), and then further cooling the conditioned bellows structure 104 in an air atmosphere.

In additional embodiments, at least one different thermal annealing process may be utilized to form the conditioned bellows structure 104. By way of non-limiting example, in some embodiments, at least one of a different furnace annealing process, a rapid thermal annealing process, a plasma annealing process, a laser annealing process, a flame annealing process, a flash annealing process, an infrared (IR) annealing process, a microwave annealing (MWA) process, and a radio frequency (RF) annealing process may be utilized to modify one or more properties of the preformed bellows structure and form the conditioned bellows structure 104. The thermal annealing process selected to form the conditioned bellows structure 104, as well as the operational parameters of the selected thermal annealing process, may at least partially depend on the dimensions and material composition of the preformed bellows structure.

The preformed bellows structure may be exposed to a single thermal annealing process to form the conditioned bellows structure 104, or may be exposed to multiple thermal annealing processes to form the conditioned bellows structure 104. If multiple thermal annealing processes are utilized, an initial thermal annealing process may partially anneal the preformed bellows structure to modify one or more properties (e.g., residual stresses, material density, material porosity, structural defects, etc.) of the preformed bellows structure, and at least one other thermal annealing process may further anneal the preformed bellows structure to further modify one or more properties (e.g., residual stresses, material density, material porosity, structural defects, etc.) of the partially annealed preformed bellows structure and form the conditioned bellows structure 104. Each of the thermal annealing processes may be substantially the same (e.g., utilize substantially the same temperature, pressure, duration, ambient conditions, etc.), or at least one of the multiple thermal annealing processes may be different than at least one other of the thermal annealing processes (e.g., utilize at least one of a different temperature, a different pressure, a different duration, different ambient conditions, etc.). In some embodiments, the preformed bellows structure is exposed to a single thermal annealing process to form the conditioned bellows structure 104.

Subjecting a preformed bellows structure to at least one thermal annealing process to form the conditioned bellows structure 104 may provide the conditioned bellows structure 104 with enhanced properties (e.g., reduced residual stress, increased material density, reduced material porosity, reduced defects, etc.) as compared to subjecting a material to be included in the conditioned bellows structure 104 to a thermal annealing process to form a conditioned material and then processing (e.g., cutting, shaping, stamping, welding, laser treating, etc.) the conditioned material to form the conditioned bellows structure 104. For example, subjecting the preformed bellows structure to the thermal annealing process to form the conditioned bellows structure 104 may repair defects (e.g., cracks, fractures, channels, pores, etc.) formed during the production of the preformed bellows structure that may otherwise be present (e.g., remain) in the conditioned bellows structure 104 if the conditioned bellows structure 104 was simply formed by processing (e.g., cutting, shaping, stamping, welding, laser treating, etc.) at least one conditioned material and/or at least one conditioned substructure (e.g., without preforming an anneal process after processing the conditioned material(s) and/or the conditioned substructure(s)). Such unrepaired defects may, for example, otherwise permit undesirable material diffusion (e.g., $H_2$ diffusion, $H^+$ diffusion) through the conditioned bellows structure 104. In additional embodiments, at least one thermal annealing process may be employed to condition at least one material and/or at least one substructure to be included in the conditioned bellows structure 104, and then the conditioned material and/or the conditioned substructure may be further processed (e.g., cut, shaped, stamped, welded, laser treated, etc.) to form the conditioned bellows structure 104.

In some embodiments, the preformed bellows structure is subjected to the thermal annealing process to form the conditioned bellows structure 104 prior to attaching the conditioned bellows structure 104 to the housing structure 102. In such embodiments, the attachment process (e.g., bonding process, welding process, etc.) may be selected and controlled to limit the formation of defects within the conditioned bellows structure 104. For example, if a welding process is utilized to attach the conditioned bellows structure 104 to the housing structure 102, the welding process may be selected and controlled to substantially limit the formation of defects (if any) within the conditioned bellows structure 104 to the location of the weld joint alone. In additional embodiments, the preformed bellows structure is attached to the housing structure 102, and then at least the preformed bellows structure is subjected to the thermal annealing process to form the conditioned bellows structure 104. In such embodiments, at least the material compositions of the preformed bellows structure, the housing structure 102, and any bonding material (e.g., weld material) may be selected relative to one another to substantially limit the formation of defects resulting from thermal annealing the preformed bellows structure after attachment to the housing structure 102.

Figure 2:
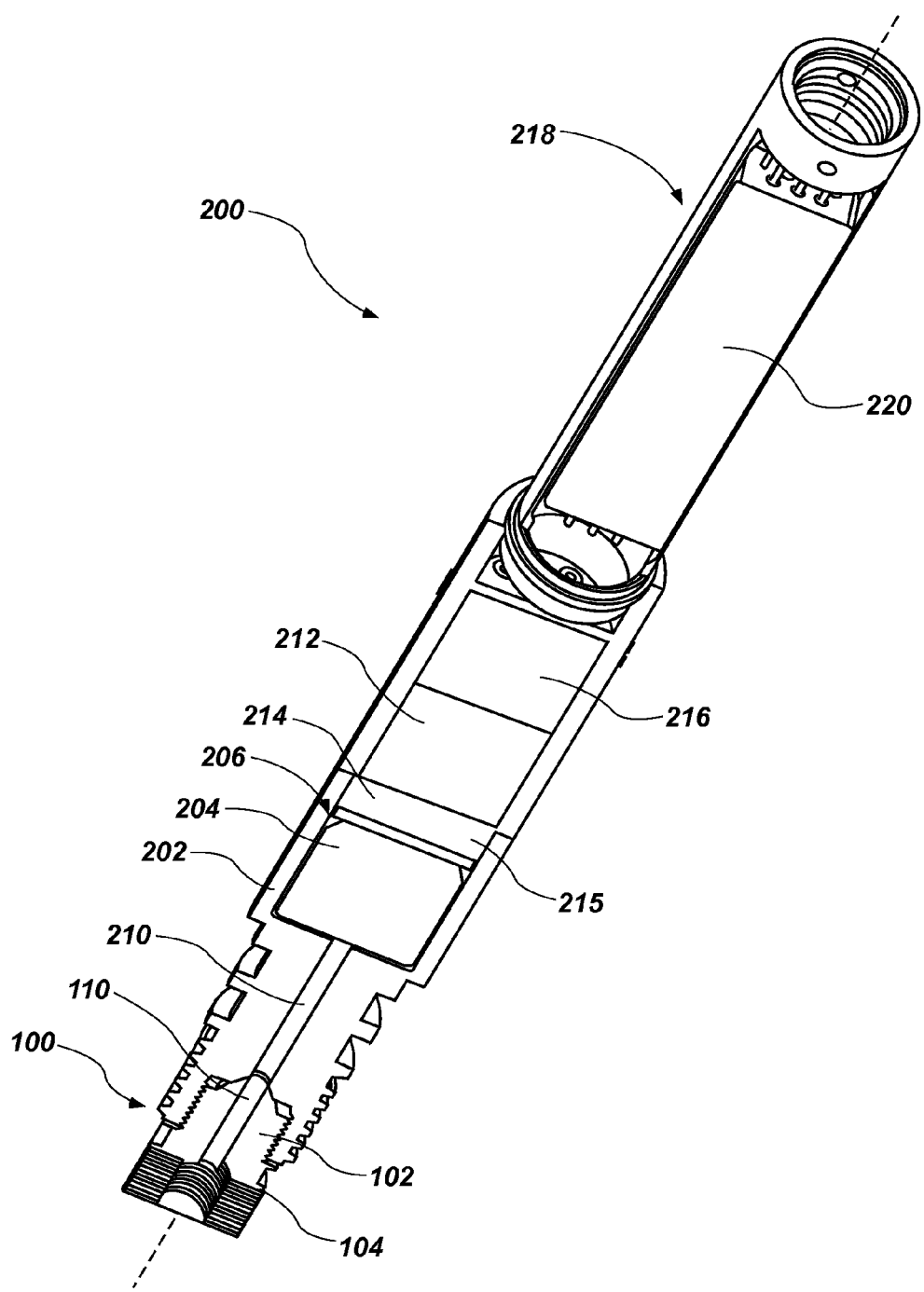
FIG. 2 is a perspective view of a sensor assembly including the conditioned isolation element of FIG. 1A.

FIG. 2 is a simplified partial cross-sectional view of a sensor assembly 200 (e.g., a pressure sensor assembly), in accordance with an embodiment of the disclosure. As shown in FIG. 2, the sensor assembly 200 may include the conditioned isolation element 100 previously described in relation to FIGS. 1A and 1B. The sensor assembly 200 may also include a sensor housing 202 operatively associated with the conditioned isolation element 100. The conditioned isolation element 100 may be attached to the sensor housing 202 of the sensor assembly 200 through engagement of the threaded stem region 106 (FIGS. 1A and 1B) of conditioned isolation element 100 with an associated threaded region of the sensor housing 202. Accordingly, the conditioned isolation element 100 may be removable from the sensor housing 202. In additional embodiments, the conditioned isolation element 100 may be removably attached to the sensor housing 202 through at least one other means including, but not limited to, a metal crush seal, an O-ring type seal, a slip fit, and a press fit. In further embodiments, the conditioned isolation element 100 may be effectively permanently attached (e.g., welded) to the sensor housing 202.

The sensor assembly 200 may also include at least one pressure sensor 204 disposed within a chamber 206 of the sensor housing 202. The chamber 206 of the sensor housing 202 may be in communication (e.g., fluid communication) with the conditioned isolation element 100. A fluid may be disposed within the chamber 206 (e.g., around a periphery of the pressure sensor 204), a channel 210 (e.g., opening, bore, aperture, via, etc.) longitudinally extending between the chamber 206 and the conditioned isolation element 100, and the conditioned isolation element 100 (e.g., within the opening 110 extending through the housing structure 102, and within the conditioned bellows structure 104). The fluid may transmit at least one of pressure and temperature from an exterior of the sensor assembly 200 to the pressure sensor 204. In some embodiments, the fluid comprises a substantially incompressible, low thermal expansion fluid. The fluid may comprise, for example, oil such as a PARATHERM® oil (available from Paratherm Corp. of West Conshohocken, Pa.), and/or a sebacate oil. The pressure sensor 204 (e.g., a quartz crystal sensor) may be configured and operated to detect the pressure and thermal expansion of the fluid.

The sensor assembly 200 may further include at least one additional sensor, such as an additional pressure sensor, a temperature sensor, a radiation sensor, a moisture sensor, a pH sensor, or a combination thereof. In some embodiments, the additional sensor is configured and operated to determine and compensate for environmental conditions that may affect the measurements of the pressure sensor 204. For example, as shown in FIG. 2, the sensor assembly 200 may include at least one temperature sensor 212 at least partially isolated from the fluid within the chamber 206 by way of a pressure feedthrough portion 214 including a bulkhead 215. The temperature sensor 212 may be configured and operated to sense the temperature of the exterior environment to compensate for temperature-induced changes and inaccuracies in the measurements of the pressure sensor 204. As another example, the sensor assembly 200 may include at least one reference sensor 216. The reference sensor 216 may be at least partially isolated from the fluid within the chamber 206 (e.g., by way of the pressure feedthrough portion 214 including the bulkhead 215), and may be configured and operated for comparison of exterior environmental conditions (e.g., pressures, temperatures, etc.) detected thereby with environmental conditions detected by at least one other sensor (e.g., the pressure sensor 204, the temperature sensor 212, etc.) of the sensor assembly 200.

As shown in FIG. 2, the sensor assembly 200 may also include an electronics housing 218 coupled to the sensor housing 202, and an electronics assembly 220 within the electronics housing 218. The electronics assembly 220 may be at least partially isolated from the fluid within chamber 206 of the sensor housing 202, and may be operatively associated with (e.g., electrically coupled to) one or more other components (e.g., the pressure sensor 204, the temperature sensor 212, the reference sensor 216, etc.) of the sensor assembly 200. The electronics assembly 220 may be configured and operated to communicate with and operate (e.g., drive) the one or more other components of the sensor assembly 200. Accordingly, the electronics assembly 220 may include various structures and/or devices configured to transmit, receive, and/or store information (e.g., operation commands, pressure data, temperature data, etc.), such as one or more input devices, output devices, memory devices, switches, resistors, capacitors, inductors, diodes, cases, etc.

It is noted that in FIG. 2, the various components of the sensor assembly 200 (e.g., the conditioned isolation element 100, the pressure sensor 204, the temperature sensor 212, and the reference sensor 216, the electronics assembly 220, etc.) are shown as being provided at particular locations relative to one another. However, the various components of the sensor assembly 200 are shown in FIG. 2 at such particular locations for simplicity and not as a physical limitation. Thus, one or more of the various components of the sensor assembly 200 may be provided at different locations relative to one another than those depicted in FIG. 2.

In some embodiments, the sensor assembly 200 according to embodiments of the disclosure includes components (e.g., structures, sensors, electronics, housings, etc.), component positions, component orientations, and/or methods of formation similar to the assembly components, component positions, component orientations, and/or methods of formation disclosed in at least one of U.S. Pat. No. 8,333,117 to Brown et al., U.S. Pat. No. 6,131,462 to EerNisse et al., U.S. Pat. No. 5,471,882 to Wiggins, U.S. Pat. No. 5,231,880 to Ward et al., U.S. Pat. No. 4,550,610 to EerNisse et al., and U.S. Pat. No. 3,561,832 to Karrer et al., the disclosure of each of which is hereby incorporated herein in its entirety by this reference.

During use and operation of the sensor assembly 200, the conditioned bellows structure 104 of the conditioned isolation element 100 may be subjected to an applied pressure from a working environment. In response, the conditioned bellows structure 104 may comply, compress, or expand, and the applied pressure may be transmitted by the fluid (e.g., a substantially incompressible, low thermal expansion fluid) through the opening 110 and the channel 210 to the pressure sensor 204 within the chamber 206 of the sensor housing 202. The pressure sensor 204 may detect the change in pressure, and relay the information to the electronics assembly 220. The electronics assembly 220 may then communicate with one or more other devices and further actions may be performed, as desired. The configuration of the conditioned bellows structure 104 of the conditioned isolation element 100 may prevent, by substantially limiting, the undesired diffusion of materials (e.g., $H_2$) through the conditioned bellows structure 104, thereby substantially mitigating at least one of inaccurate measurements (e.g., due to undesired inflation of the bellows structure) and component damage (e.g., bellows structure rupture) that may otherwise result from the diffused materials. The sensor assembly 200 may, optionally, also be configured and operated to detect, communicate, and/or act upon (e.g., adjust for) other conditions (e.g., temperature, pH, radiation, etc.) of the working environment (e.g., by way of the temperature sensor 212, the reference sensor 216, another sensor, etc.).

In additional embodiments, the sensor assembly 200 may exhibit a different configuration, such as a configuration including a different conditioned isolation element location and/or different conditioned isolation element. A different conditioned isolation element location may, for example, include a location substantially internal to a housing (e.g., the sensor housing 202) of the sensor assembly 200. A different conditioned isolation element may include a different conditioned isolation element structure than the conditioned bellows structure 104 previously described in relation to FIGS. 1A and 1B, such as at least one of a different conditioned bellows structure, a conditioned diaphragm structure, and a conditioned bladder structure.

Figure 3A:
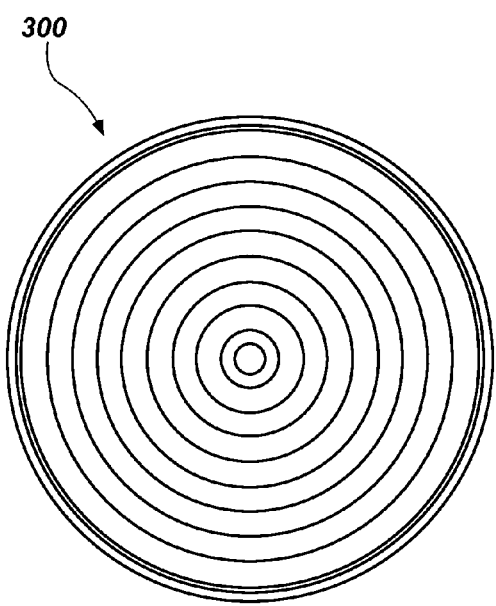
FIG. 3A is a perspective view of a conditioned diaphragm structure, in accordance with another embodiment of the disclosure.
Figure 3B:
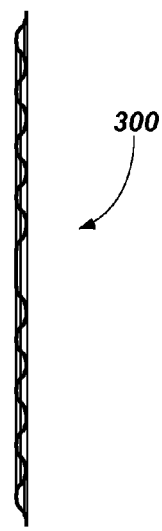
FIG. 3B is a cross-sectional side view of the conditioned diaphragm structure of FIG. 3A.

By way of non-limiting example, FIG. 3A is a top-down view of a conditioned diaphragm structure 300, in accordance with additional embodiments of disclosure. FIG. 3B is a cross-sectional view of the conditioned diaphragm structure 300 shown in FIG. 3A. The conditioned diaphragm structure 300 may be a component of a larger conditioned isolation element (e.g., similar to the conditioned bellows structure 104 previously described in relation to FIGS. 1A and 1B), such as a conditioned isolation element further including a housing structure attached to the conditioned diaphragm structure 300, or may itself comprise the conditioned isolation element. As depicted in FIGS. 3A and 3B, the conditioned diaphragm structure 300 may exhibit a substantially circular shape. In additional embodiments, the conditioned diaphragm structure 300 may exhibit a different shape, such as a least one of a tetragonal shape, (e.g., square, rectangular, trapezium, trapezoidal, parallelogram, etc.), a semicircular shape, an ovular shape, an elliptical shape, and a triangular shape. Furthermore, the conditioned diaphragm structure 300 may include a plurality of corrugations (e.g., a series of alternating ridges and grooves) configured to deform (e.g., comply, expand, compress, etc.) in response to changes (e.g., increases, decreases, etc.) in applied pressure and/or temperature. The conditioned diaphragm structure 300 may include any number of the corrugations, such as from about three (3) corrugations to about one hundred (100) corrugations.

The conditioned diaphragm structure 300 may be formed of and include at least one material resistant to at least one of physical degradation and chemical degradation (e.g., at least one material suitable for use in a high-pressure, high-temperature, corrosive, and/or abrasive environment, such as the extremely aggressive environments of various downhole applications), such as one or more of the materials previously described with respect to the conditioned bellows structure 104 (FIGS. 1A and 1B). In addition, similar to the material of the conditioned bellows structure 104, the material of the conditioned diaphragm structure 300 is conditioned (e.g., modified) to exhibit at least one of reduced residual stress, reduced porosity, increased density, reduced defects, and reduced material permeability as compared to an unconditioned state of the material. The conditioned state of the material (and, hence, the conditioned diaphragm structure 300) may be substantially less susceptible to material permeation, embrittlement, and/or stress-cracking than the unconditioned state of the material (and, hence, an unconditioned bellows structure). For example, the conditioned state of the material may be at least two times (2×) less susceptible to hydrogen permeation (e.g., hydrogen gas permeation, hydrogen ion permeation, etc.), hydrogen-based embrittlement, and/or hydrogen-based stress-cracking, such as at least three times (3×) less susceptible, at least four times (4×) less susceptible, or substantially insusceptible. In some embodiments, the conditioned diaphragm structure 300 is formed of and includes at least one conditioned material substantially impermeable to hydrogen.

The conditioned diaphragm structure 300 may be formed by subjecting a preformed diaphragm structure to at least one thermal annealing process (e.g., an IR annealing process, a flame annealing process, a laser annealing process, an MWA process, an RF annealing process, etc.), such as a thermal annealing process substantially similar to the thermal annealing process previously described in relation to the formation of the conditioned bellows structure 104. The preformed diaphragm structure may be attached (e.g., welded) to another structure (e.g., a housing structure, such as a housing structure of a larger conditioned isolation element and/or a sensor housing) prior to performing the thermal annealing process to form the conditioned diaphragm structure 300, and/or the conditioned diaphragm structure 300 may be attached to another structure following formation.

Figure 4:
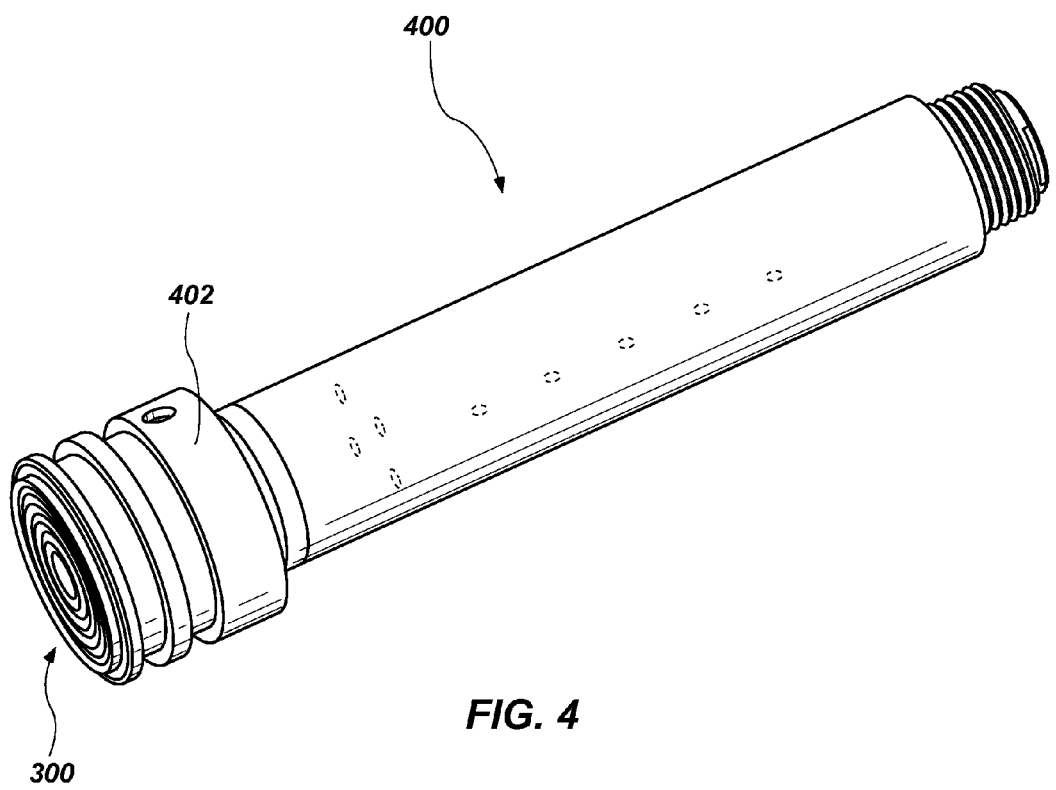
FIG. 4 is a perspective view of a sensor assembly including the conditioned diaphragm structure of FIG. 3A.

FIG. 4 is a simplified partial cross-sectional view of a sensor assembly 400 (e.g., a pressure sensor assembly), in accordance with an embodiment of the disclosure. As shown in FIG. 4, the sensor assembly 400 may include the conditioned diaphragm structure 300 previously described in relation to FIGS. 3A and 3B. The sensor assembly 400 may also include a sensor housing 402 operatively associated with the conditioned diaphragm structure 300. The conditioned diaphragm structure 300 may be attached (e.g., directly attached, indirectly attached) to the sensor housing 402. In some embodiments, the conditioned diaphragm structure 300 is directly attached to the sensor housing 402. For example, the conditioned diaphragm structure 300 may be welded to the sensor housing 402. In additional embodiments, the conditioned diaphragm structure 300 is indirectly attached to the sensor housing 402. For example, the conditioned diaphragm structure 300 may be directly attached (e.g., welded) to another housing structure, and the another housing structure may be directly attached (e.g., threadably attached, metal crush sealed, slip fit, press fit, etc.) to the sensor housing 402.

The sensor assembly 400 also includes other components, such as structures (e.g., housings), fluids (e.g., substantially incompressible, low thermal expansion fluid), sensors (e.g., pressure sensors, temperature sensors, reference sensors), electronics assemblies, and/or devices similar to those previously described in relation to the sensor assembly 200 (FIG. 2). In some embodiments, the sensor assembly 400 according to embodiments of the disclosure includes components (e.g., structures, sensors, electronics, housings, etc.), component positions, component orientations, and/or methods of formation similar to the assembly components, component positions, component orientations, and/or methods of formation disclosed in at least one of U.S. Pat. No. 8,333,117 to Brown et al., U.S. Pat. No. 6,131,462 to EerNisse et al., U.S. Pat. No. 5,471,882 to Wiggins, U.S. Pat. No. 5,231,880 to Ward et al., U.S. Pat. No. 4,550,610 to EerNisse et al., and U.S. Pat. No. 3,561,832 to Karrer et al., the disclosure of each of which was previously incorporated herein in its entirety by this reference.

During use and operation of the sensor assembly 400, the conditioned diaphragm structure 300 may be subjected to an applied pressure from a working environment. In response, the conditioned diaphragm structure 300 may comply, compress, or expand, and the applied pressure may be transmitted (e.g., by a fluid, such as a substantially incompressible, low thermal expansion fluid) to a pressure sensor (e.g., a pressure sensor similar to the pressure sensor 204 depicted in FIG. 2) within the sensor housing 402. The pressure sensor may detect the change in pressure, and relay the information to an electronics assembly (e.g., an electronics assembly similar to the electronics assembly 220 depicted in FIG. 2). The electronics assembly may then communicate with one or more other devices and further actions may be performed, as desired. The configuration of the conditioned diaphragm structure 300 may prevent, by substantially limiting, the undesired diffusion of materials (e.g., $H_2$) through the conditioned diaphragm structure 300, thereby substantially mitigating at least one of inaccurate measurements and component damage (e.g., diaphragm structure rupture) that may otherwise result from the diffused materials. The sensor assembly 400 may also be configured and operated to detect, communicate, and/or act upon (e.g., adjust for) other conditions (e.g., temperature, pH, radiation, etc.) of the working environment (e.g., by way of a temperature sensor, a reference sensor, another sensor, etc.).

The conditioned isolation elements of the disclosure, including the various conditioned isolation element structures thereof (e.g., the conditioned bellows structure 104, the conditioned diaphragm structure 300, etc.), may exhibit enhanced properties (e.g., reduced residual stresses, increased material density, decreased material porosity, reduced defects, reduced material permeability, etc.) as compared to conventional isolation elements. For example, the conditioning processes (e.g., thermal annealing processes) of the disclosure may facilitate reduced diffusion of $H_2$ through the conditioned isolation elements relative to conventional isolation elements. The conditioned isolation elements may, in turn, improve one or more properties of assemblies (e.g., the sensor assemblies 200, 400) into which they are incorporated. For example, the sensor assemblies 200, 400 of the disclosure may have fewer $H_2$-diffusion-based problems (e.g., calibration shifts, zero offsets, component damage) as compared to conventional sensor assemblies not including the conditioned isolation elements of the disclosure. Accordingly, the sensor assemblies 200, 400 of the disclosure provide enhanced reliability, performance, and durability as compared to conventional sensor assemblies.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A method of forming a conditioned isolation element for a sensor assembly, comprising:
   providing a housing structure comprising:
      a threaded stem;
      a sealing element extending from an upper end of the threaded stem; and
      a shelf at a lower end of the threaded stem and laterally extending beyond outermost lateral boundaries of the threaded stem;
   welding a bellows structure to a lower end of the shelf of the housing structure to form a preformed isolation element structure; and
   subjecting the preformed isolation element structure to at least one thermal annealing process to form a conditioned isolation element structure comprising the housing structure and a conditioned bellows structure comprising an annealed material substantially impermeable to hydrogen ions and resistant to one or more of physical degradation and chemical degradation, the conditioned isolation element structure substantially less susceptible to one or more of hydrogen ion permeation, hydrogen based embrittlement, and hydrogen-based stress-cracking than the preformed isolation element.

2. The method of claim 1, wherein subjecting the preformed isolation element structure to at least one thermal annealing process comprises subjecting the preformed isolation element to a temperature greater than or equal to about 900° C. for greater than or equal to about 30 minutes.

3. The method of claim 2, wherein subjecting the preformed isolation element structure to at least one thermal annealing process further comprises heating the preformed isolation element structure in an inert atmosphere.

4. The method of claim 2, wherein subjecting the preformed isolation element structure to at least one thermal annealing process further comprises heating the preformed isolation element structure under negative pressure.

5. The method of claim 4, further comprising performing at least one nitrogen gas quench after heating the preformed isolation element structure under negative pressure.

6. The method of claim 1, wherein subjecting a preformed isolation element structure to at least one thermal annealing process comprises subjecting a preformed bellows structure to the at least one thermal annealing process, the preformed bellows structure comprising corrugated sidewalls coupled to a floor structure.

7. The method of claim 1, wherein subjecting a preformed isolation element structure to at least one thermal annealing process comprises subjecting a preformed diaphragm structure to the at least one thermal annealing process.

8. The method of claim 1, further comprising selecting the preformed isolation element structure to comprise a metal alloy resistant to at least one of physical degradation and chemical degradation.

9. The method of claim 1, further comprising attaching the preformed isolation element structure to a housing structure prior to performing the at least one thermal annealing process.

10. The method of claim 1, further comprising attaching the conditioned isolation element structure to a housing structure.

11. A conditioned isolation element for a sensor assembly, the conditioned isolation element comprising:
   a housing structure comprising:
      a threaded stem;
      a sealing element extending from an upper end of the threaded stem; and
      a shelf at a lower end of the threaded stem and laterally extending beyond outermost lateral boundaries of the threaded stem; and
   a conditioned bellows structure welded to a lower end of the shelf of the housing structure and comprising an annealed material substantially impermeable to hydrogen ions and resistant to one or more of physical degradation and chemical degradation.

12. The conditioned isolation element of claim 11, wherein the conditioned bellows structure is only welded to the lower end of the shelf of the housing structure at one or more peripheral surfaces defining an undercut region of the shelf of the housing structure.

13. The conditioned isolation element of claim 11, wherein the conditioned bellows structure comprises one or more of a conditioned metal, a conditioned ceramic, and a conditioned ceramic-metal composite material.

14. A sensor assembly, comprising:
   a conditioned isolation element comprising:
      a housing structure comprising:
         a threaded stem;
         a sealing element extending from an upper end of the threaded stem: and
         a shelf at a lower end of the threaded stem and laterally extending beyond outermost lateral boundaries of the threaded stem; and
      a conditioned bellows structure welded to a lower end of the shelf of the housing structure and comprising an annealed material substantially impermeable to hydrogen ions and resistant to one or more of physical degradation and chemical degradation;
   a sensor housing threadably coupled to the threaded stem of the housing structure of the conditioned isolation element and exhibiting a chamber in fluid communication with the conditioned isolation element through a channel between the sensor housing and conditioned isolation element; and at least one sensor within the chamber of the sensor housing.

15. The sensor assembly of claim 14, wherein the conditioned bellows structure comprises a conditioned metal alloy bellows structure only welded to the lower end of the shelf of the housing structure at one or more peripheral surfaces defining an undercut region of the shelf of the housing structure.

16. The conditioned isolation element of claim 11, wherein the annealed material of the conditioned structure comprises a conditioned 625 alloy steel that has been thermally annealed beyond initial annealing employed to form 625 alloy steel.

17. The conditioned isolation element of claim 11, wherein the conditioned bellows structure comprises:

conditioned, corrugated sidewalls comprising a plurality of corrugations configured to deform in response to changes in one or more of applied pressure and applied temperature; and a conditioned floor coupled to the conditioned, corrugated sidewalls.

18. The conditioned isolation element of claim 11, wherein a material composition of the conditioned bellows structure is different than that of the housing structure.

* * * * *